(12) United States Patent
Bergan

(10) Patent No.: US 10,960,521 B2
(45) Date of Patent: Mar. 30, 2021

(54) DRILL, DRILL BIT AND STAPLES FOR USE THEREFOR

(71) Applicant: Joshua T. Bergan, West Tisbury, MA (US)

(72) Inventor: Joshua T. Bergan, West Tisbury, MA (US)

(*) Notice: Subject to any disclaimer, the term of this patent is extended or adjusted under 35 U.S.C. 154(b) by 200 days.

(21) Appl. No.: 16/121,950

(22) Filed: Sep. 5, 2018

(65) Prior Publication Data

US 2019/0381638 A1 Dec. 19, 2019

Related U.S. Application Data

(63) Continuation-in-part of application No. 15/287,441, filed on Oct. 6, 2016, now Pat. No. 10,087,971.

(51) Int. Cl.
| | |
|---|---|
| *B25B 21/00* | (2006.01) |
| *F16H 1/20* | (2006.01) |
| *F16L 3/12* | (2006.01) |
| *F16L 3/04* | (2006.01) |
| *B25B 23/02* | (2006.01) |

(52) U.S. Cl.
CPC ............ *B25B 21/002* (2013.01); *B25B 23/02* (2013.01); *F16H 1/20* (2013.01); *F16L 3/04* (2013.01); *F16L 3/1207* (2013.01)

(58) Field of Classification Search
CPC ....... B25B 21/002; B25B 23/02; B25B 17/00; B25B 13/481; B25B 13/467; B25B 17/02; B25B 21/00; B25B 21/001; B25B 21/007; B25B 23/00; B25B 23/04; B25B 23/14; B25B 23/142; B25B 23/145; B25B 23/1453; B25B 23/147; B25B 25/00; B25B 27/00; B25B 31/00; F16H 1/20; F16L 3/04; F16L 3/1207; F16B 35/06
See application file for complete search history.

(56) References Cited

U.S. PATENT DOCUMENTS

| | | | | |
|---|---|---|---|---|
| 1,563,887 | A * | 12/1925 | Wiespetat | ............ B23Q 16/001 408/135 |
| 4,653,356 | A * | 3/1987 | Golden | .............. B23Q 3/15533 81/177.4 |
| 4,850,254 | A * | 7/1989 | Burney | .................. B25B 5/068 81/367 |
| 5,218,758 | A * | 6/1993 | Nguyen | ................. H01R 43/26 29/426.5 |
| 5,312,023 | A | 5/1994 | Green et al. | |
| 5,433,850 | A * | 7/1995 | Murray | .................. A01K 59/04 210/361 |
| 6,543,667 | B2 | 4/2003 | Yoshie et al. | |

(Continued)

*Primary Examiner* — Robert J Scruggs
(74) *Attorney, Agent, or Firm* — Nexsen Pruet, LLC

(57) ABSTRACT

A drill, drill bit and staples for use in attaching staples to a support by driving two parallel screws in the same direction simultaneously, one held by each side of the staple, so as to secure wiring to the support using the staple. The drill bit includes a central gear and two planetary gears, which gears rotate a screw-driving tool. The drill bit is held by the chuck of a drill and, when its central gear is rotated, rotates the planetary gears that drive the two screws. A harness may used to attach the housing of the drill bit to the drill to prevent rotation of the housing when the central and planetary gears are rotating. The drill may be rotatable from horizontal to vertical, telescoping and permit the bit to be rotated 90 degrees.

16 Claims, 12 Drawing Sheets

(56) References Cited

U.S. PATENT DOCUMENTS

| | | | | |
|---|---|---|---|---|
| 7,546,988 | B1 * | 6/2009 | Schecter | F16L 3/1207 248/73 |
| 7,637,182 | B1 * | 12/2009 | Long | B23P 19/069 81/57.22 |
| 8,109,344 | B1 * | 2/2012 | Hays | B25F 3/00 173/50 |
| 8,616,431 | B2 | 12/2013 | Timm et al. | |
| 8,931,682 | B2 | 1/2015 | Timm et al. | |
| 9,186,143 | B2 | 11/2015 | Timm et al. | |
| 10,087,971 | B1 | 10/2018 | Bergan | |
| 2013/0233131 | A1 * | 9/2013 | Badiali | B25B 21/007 81/57.3 |
| 2016/0220247 | A1 | 8/2016 | Timm et al. | |
| 2016/0249911 | A1 | 9/2016 | Timm et al. | |

\* cited by examiner

DRILL, DRILL BIT AND STAPLES FOR USE THEREFOR

TECHNOLOGICAL FIELD

The disclosed apparatus relates generally to using staples to attach electrical wiring to support surfaces using staples as part of the process of running electrical wiring throughout a building.

BACKGROUND

Wiring is used for conducting electricity or electrical signals. Wiring includes any elongated and non-self-supporting electrical conductor, whether insulated or not insulated. In running wiring from place to place in a building, wiring may be supported by the surfaces of support members such as posts, beams, and the like. Supported wiring may be easier to find, to trace, and to protect from damage and may be less likely to cause tripping injuries. A way to attach wiring to a support surface is to fasten it with staples. A staple, which has two sharpened legs, can straddle the wiring and be driven into the support to hold the wiring in position.

A worker fastening the wiring to a support with staples may be holding the staple over the wiring and using a hammer to drive the two legs of the staple into the support. The worker may be working on a ladder or in cramped areas, and may have difficulty finding a position from which to drive the staples in position properly. Thus, there remains a need for a way to staple wiring to supports that is easier, faster and does not result in damage to the wiring.

SUMMARY

Herein is disclosed a drill bit and staples for use therefore. The staples are operable to fasten electrical wiring and the like to a support. The drill bit includes a housing and a central gear configured to be driven by a drill. The drill bit includes a first planetary gear and a second planetary gear, which are meshed with the central gear. The central gear rotates the planetary gears, which, in turn, rotate two screw-driving tools. The staples include a coupler that holds two screws in spaced apart relationship and parallel to so that they may be driven into a support by the two screw-driving tools on the tool bit. Parallel, spaced-apart passages in the coupler of the staple orient and stabilize the screws and cooperate with the screw-driving tools on the drill bit to advance the screws into the support. The coupler also prevents driving the screws too deeply and thereby potentially damaging the wiring captured by the coupler in the space between the screws.

Those skilled in the art of attaching wiring to supports will appreciate these and other features and their advantages from a careful reading of the detailed description below accompanied by the following drawings

DETAILED DESCRIPTION

Figure 1:
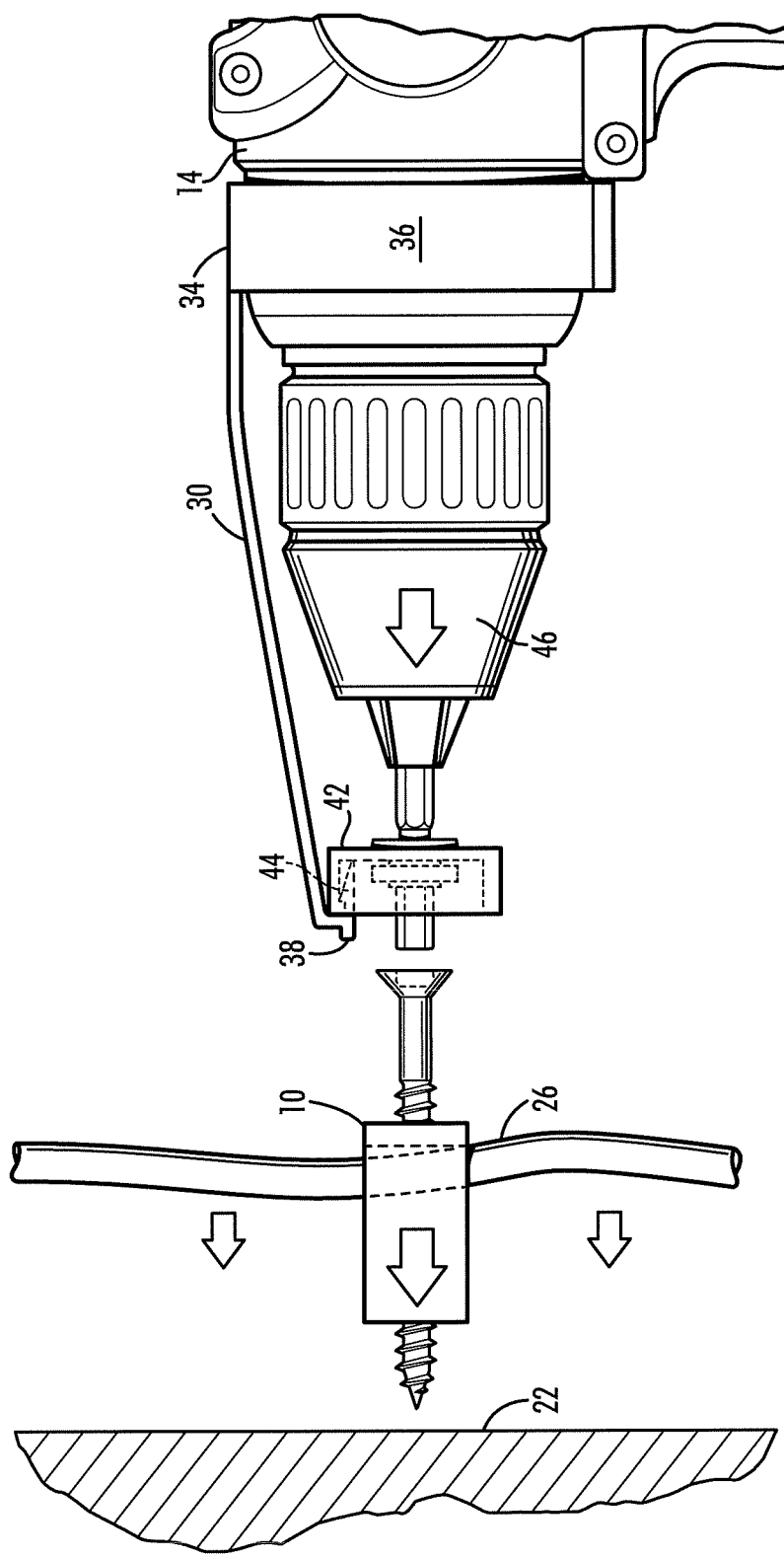
FIG. 1 is a side, exploded view of a portion of a drill and a drill bit and a staple, with the interior of drill bit shown in phantom lines and showing a harness attached to the drill and to the drill bit housing to prevent the drill bit housing from rotating; according to an aspect of the disclosure.

Referring now to the figures, a staple 10 is shown in use in FIG. 1 being driven into a support 22 by a drill 14 holding a drill bit 18 that is engaging staple 10. Staple 10, when driven into a support 22, holds a wire 26 to support 22. A series of similar staples may be used to hold wire 26 to supports such as support 22.

The term "staple" refers generally to a device operable to fasten a first object to a support such as support 22. Here, the present staple 10, shown in FIG. 1 in a side view, is used to attach a long, thin object such as wire 26 to support 22. Wire, as in wire 26, is not limited to electrically conducting metal covered by electrical insulation but any item that has one dimension much greater than its other two dimensions and is to be supported by a surface. The term wire may in the alternative may be an electrical conductor, an optical conductor, a fluid conductor, a particulate conductor, a solid conductor, a hollow conductor, a group of conductors, a closed conductor, a conductor with openings, a flexible conductor, or a rigid conductor: all will be referred to herein simply as a "wire" for convenience.

Wire 26 is fastened to a support 22 such as a beam, truss, stud, joist, wall, and the like, which support 22 may be made of wood, wood products, synthetic materials, masonry, or other material that is capable of having a screw drilled into it by drill 14 so as to hold a length of wire 26 against support 22. Drill 14 may be any type of power drill, including electric, battery-operated, hydraulic or pneumatic.

Figure 2:
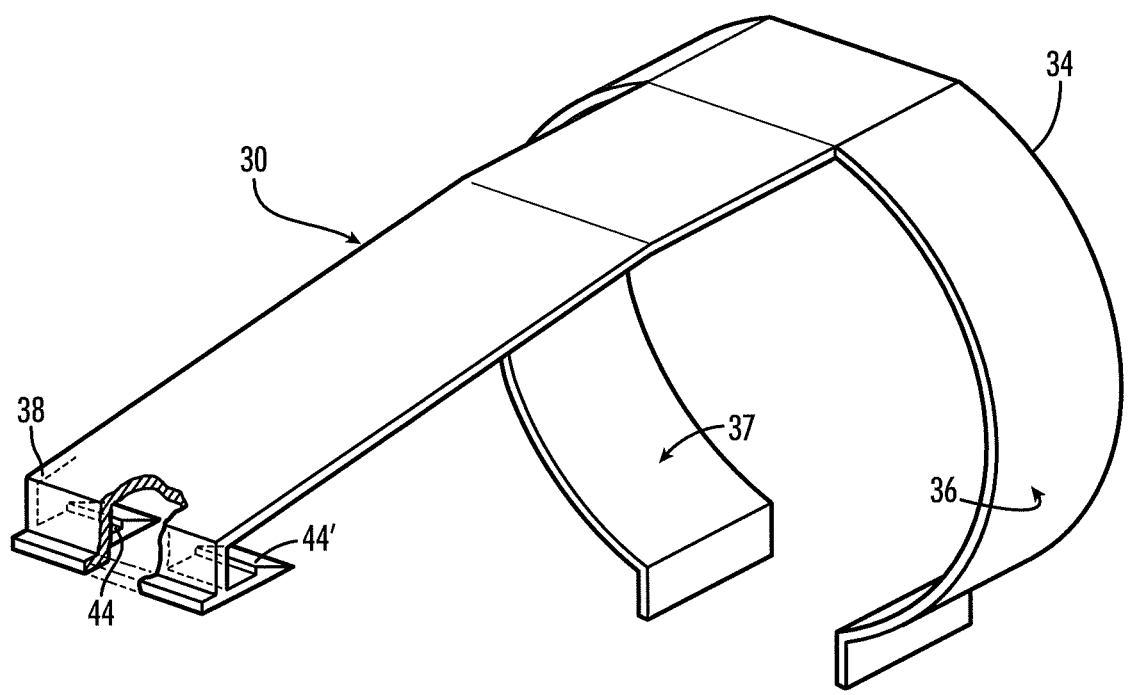
FIG. 2 is a perspective view of the harness shown in FIG. 1, partially cut away to show that projection is split, according to an aspect of the disclosure.
Figure 3:
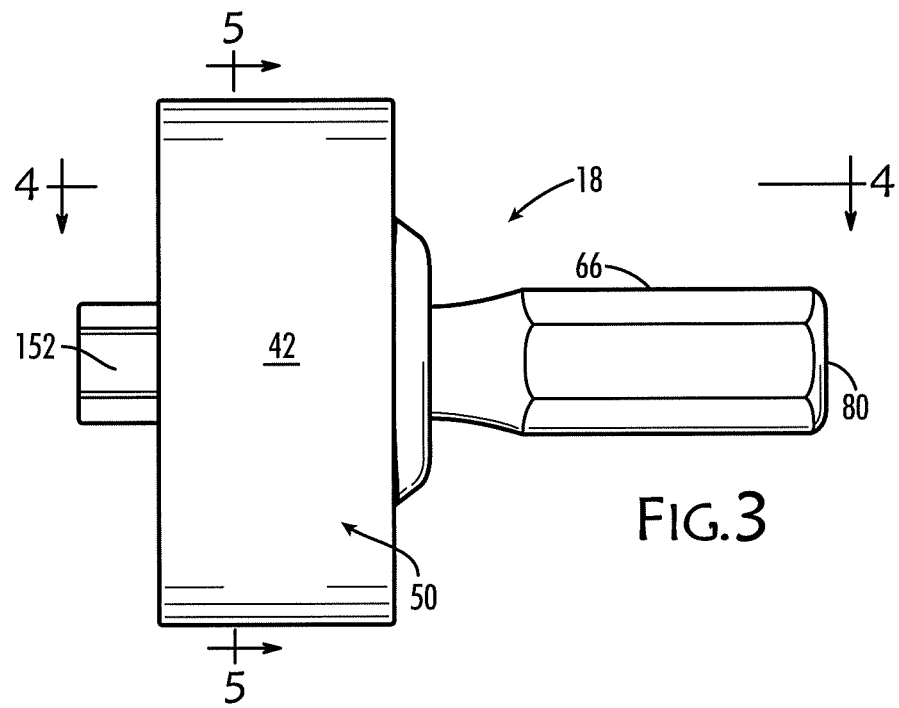
FIG. 3 is a side view of the drill bit of FIG. 1, according to an aspect of the disclosure.
Figure 4:
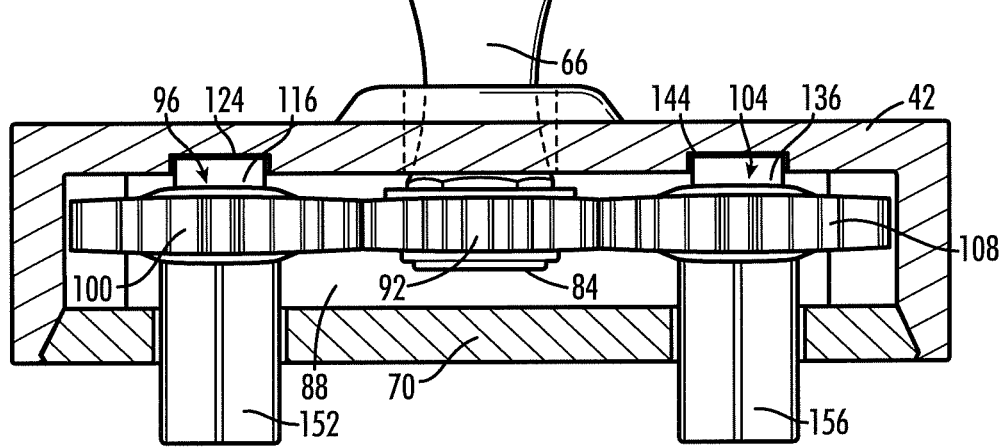
FIG. 4 is a top, cross-sectional view of the drill bit of FIG. 3 showing the central gear meshed with the first planetary gear and the second planetary gear, according to an aspect of the disclosure.
Figure 5:
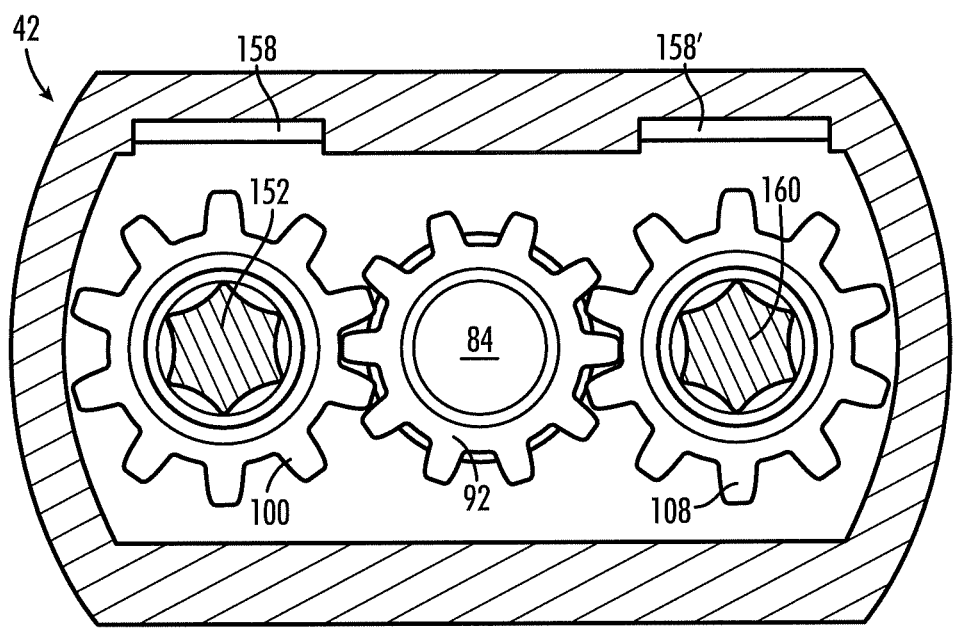
FIG. 5 is an end view of the drill bit of FIG. 3 showing central gear meshed with the first and second planetary gears, according to an aspect of the disclosure.
Figure 6:
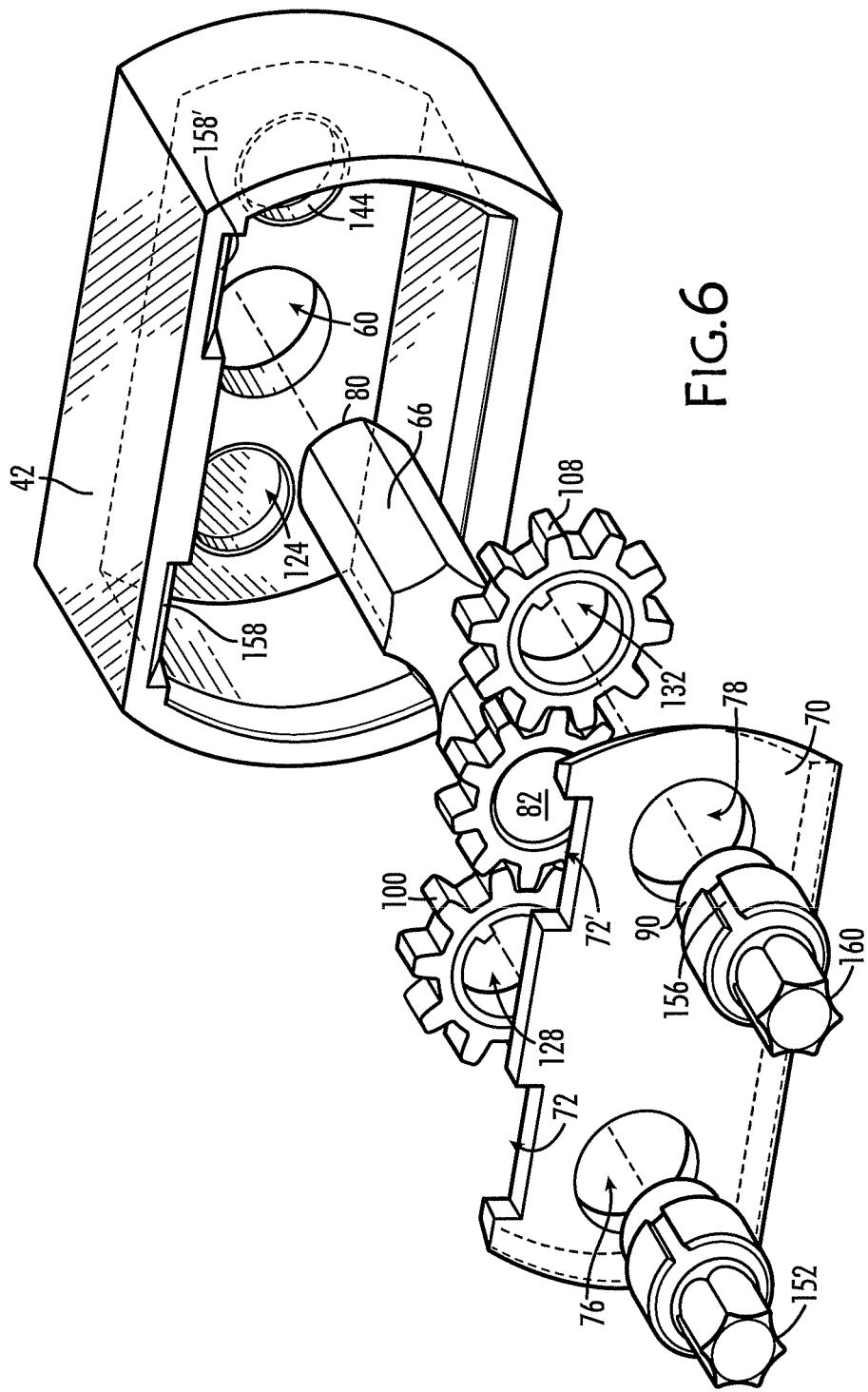
FIG. 6 is an exploded, perspective view of the drill bit of FIG. 3, according to an aspect of the disclosure.

A harness 30 is also shown in FIG. 1 for use with drill 14 and drill bit 18, and is shown by itself in FIG. 2. A first end 34 of harness 30, with a left arm 36 and a right arm 37, grips drill 14 resiliently and removably, as it is applied to drill 14 and a second end 38 of harness 30, which includes a first projection 44 and a second projection 44', is inserted into drill bit housing 42 through slots 158, 158', as shown in FIGS. 5 and 6, to prevent drill bit housing 42 from rotating when drill 14 is activated. The activation of drill 14 causes its chuck 46 to rotate. Drill bit 18 is gripped by chuck 46 and thus rotates with chuck 46, while drill bit housing 42 is held from rotation by drill 14 by harness 30.

Drill bit 18, as will be explained in more detail below, rotates two screws in staple 10 simultaneously, and drill bit housing 42 does not rotate because harness 30 holds it to drill 14. A first end 34 of harness 30 resiliently grips drill 14 and a second end 38 of harness 30 grips a projection 44 carried by drill bit housing 42. Because drill 14 does not rotate (except for chuck 46), drill bit housing 42, when held in check by harness 30, does not rotate.

Referring now to FIGS. 3, 4, 5 and 6, there is illustrated drill bit 18 from the side (FIG. 3), from the top (FIG. 4), from the end (FIG. 5), and in an exploded perspective view (FIG. 6). Drill bit 18 enables chuck 46 of drill 14 to drive a pair of screws simultaneously and in the same direction so that staple 10 can be attached to support 22 quickly and evenly.

Drill bit 18 includes drill bit housing 42 that has an interior 88 defined by a side wall 50 with an open end 54 and a closed end 58. Drill bit housing 42 may be made of plastic, metal, ceramic or composite material that provides rigidity to hold its components in use when inserting screws into a support 22. There is a hole 62 formed in closed end 58 for a central shaft 66. Central shaft 66 has a first end 80 that may be rotated when received and tightened in chuck 46 and drill 14 is operated. A second end 84 of central shaft 66 extends through hole 62 into the interior 88 of drill bit housing 42, as best seen in FIG. 6.

Inside drill bit housing 42 is a central gear 92 and two planetary gears, namely, a first planetary gear 100 and a second planetary gear 108. Central shaft 66 extends through hole 62 in closed end 58 and into interior 88 of said drill bit housing 42 to central gear 92 where it is attached to central gear 92 and operable to rotate central gear 92. First planetary gear 100 and second planetary gear 108 are meshed with central gear 92, that is, the teeth of first planetary gear 100 interleave the teeth of central gear 92, and the teeth of second planetary gear 108 interleave the teeth of central gear 92 which is thus able to rotate said first planetary gear 100 and second planetary gear 108. With central gear 92 directly meshed with first planetary gear 100 and second planetary gear 108, first and second planetary gears 100, 108, will rotate simultaneously and in the same direction, namely, the direction opposite that of central gear 92. First planetary gear 100 rotates on a first end 96 of a first shaft 116 that may be seated in a first bushing 124 in closed end 58 of drill bit housing 42. Similarly, second planetary gear 108 rotates on a first end 104 of a second shaft 136 seated in a second bushing 144 in closed end 58.

The second end 112 of first shaft 116 and the second end 120 of second shaft 136 carry first screw-driving tool 152 and second screw-driving tool 160, respectively. First screw-driving tool 152 and second screw-driving tool 160, which are driven by central gear 92 via first planetary gear 100 and second planetary gear 108, respectively, may be configured to drive any of various common types of screw fastener heads, such as a slotted head, a cross-slotted head, and "hex" head, for example, or the screw fastener head depicted in the figures, or any threaded fastener head configuration capable of transferring torque of first screw-driving tool 152 and second screw-driving tool 160 to the screws being driven.

The term configuration means that the heads of first screw-driving tool 152 and second screw-driving tool 160 have a shape that corresponds to the shape of the screws of staple 10 so that first and second screw-driving tools 152, 160 can grip and rotate screws. Using torque from drill 14 with a chuck 46, drill bit 18 can rotate two screws simultaneously and in the same direction. First planetary gear 100 and second planetary gear 108 and first screw-driving tool 152 and second screw-driving tool 160 rotate in the same direction about spaced-apart, parallel axes so they can drive screws that are spaced-apart and parallel.

First end 96 of first shaft 116 and first end 104 of second shaft 136 are attached to first planetary gear 100 and second planetary gear 108, respectively, in any suitable manner so that rotation of first planetary gear 100 and second planetary gear 108 rotate first shaft 116 and second shaft 136, respectively. As an example, a hole 132 formed in first planetary gear 100 may have a key 148 that is alignable with a slot 156 in second end 112 of first shaft 116; and a hole 140 formed in second planetary gear 108 may have a key 148 that is alignable with a slot 156 in second end 120 of second shaft 136.

As seen in FIG. 6, a plate 70 may be used to close open end 74 to cover open end 74 and assist in aligning its components including central gear 92, first planetary gear 100, and second planetary gear 108. Holes 76 and 78 are formed in plate 70 for first screw-driving tool 152 and second screw-driving tool 160 to extend outside said drill bit housing 42.

Figure 7:
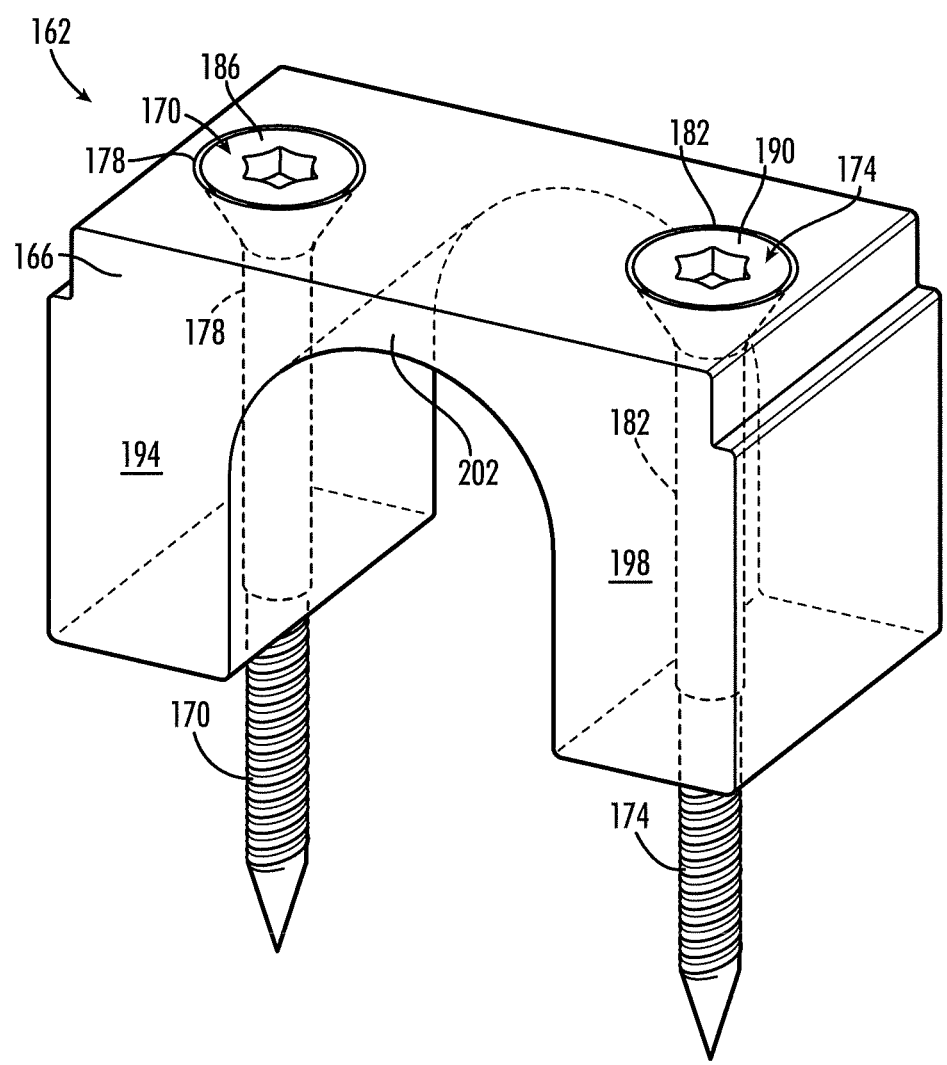
FIG. 7 is a top, right, perspective view of an arched staple for use with the drill bit of FIG. 1, according to an aspect of the disclosure.

Referring now to FIG. 7, there is illustrated a first staple 162 for use in combination with drill bit 18. First staple 162 includes a first coupler 166 and two parallel, spaced apart screws, namely, a first screw 170 and a second screw 174, carried in a passage formed in first coupler 166. First screw 170 is inserted in a first passage 178, and second screw 174 is inserted in a second passage 182. First and second passages 178 and 182, respectively, are parallel and spaced apart. First screw 170 and second screw 174 rotate freely inside first and second passages 178, 182, respectively, and the head 186 of first screw and the head 190 of second screw 174 are wider than first passage 178 and second passage 182, respectively, although the entrances of first passage 178 and second passage 182 in first coupler 166 may be widened to permit first screw 170 and second screw 174 to be countersunk, as shown in FIG. 7.

First screw 170 and second screw 174 are longer than first passage 178 and second passage 182 by a length to provide a good hold if first screw 170 and second screw 174 are driven into support 22 until first coupler 166 touches support 22.

First coupler 166 is shown in FIG. 7 to have two portions, a first portion 194 and a second portion 198 connected by a first bridge 202. In FIG. 7, first bridge 202 is arched to define room for capturing wire 26 between first portion 194 and second portion 198. The space defined below first bridge 202 and between first portion 194 and second portion 198 is dimensioned to accommodate wire 26 and may be large enough to accommodate wire 26 and hold wire 26 in place when first screw 170 and second screw 174 are driven into support 22 with wire 26 held against support 22.

Figure 8:
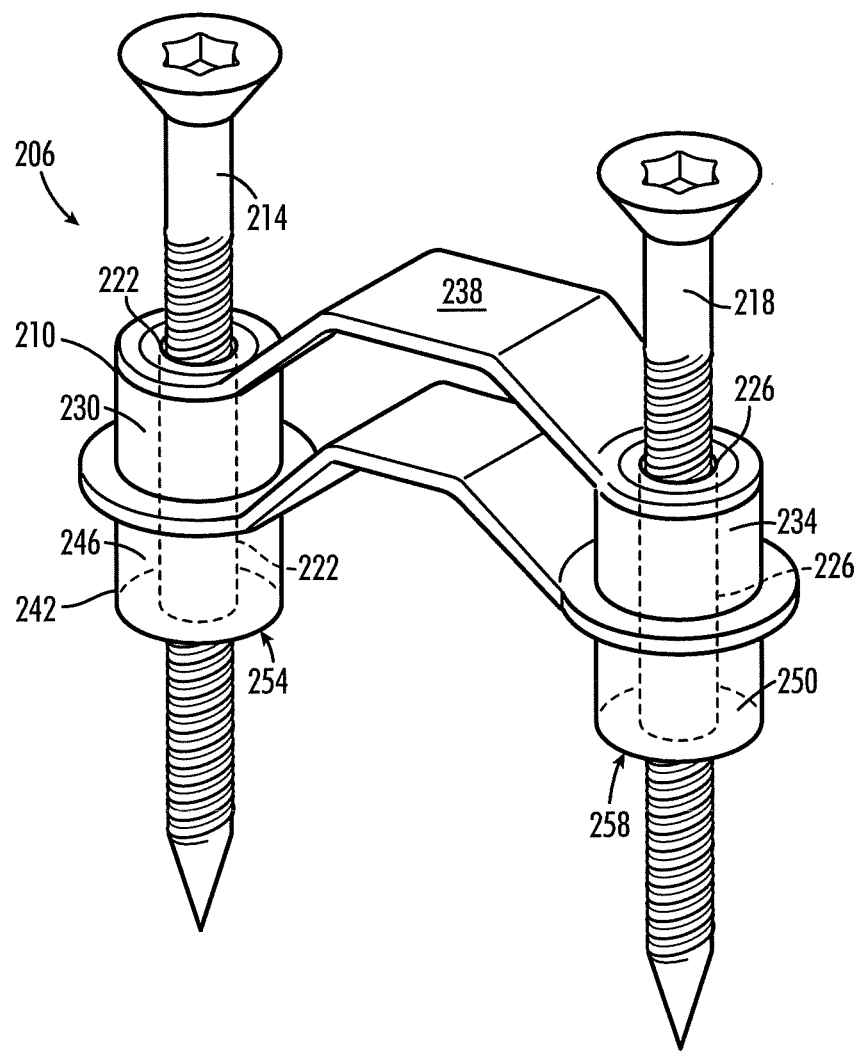
FIG. 8 is a top, right, perspective view of an alternative staple for use with the drill bit of FIG. 1, according to an aspect of the disclosure.

Referring now to FIG. 8, there is illustrated a second staple 206. Second staple 206 includes a second coupler 210 that holds a third screw 214 and a fourth screw 218 in a third passage 254 and in a fourth passage 258, respectively, formed in second coupler 210 so that third screw 214 and fourth screw 218 rotate freely. Third screw 214 and fourth screw 218 are longer than third passage 254 and fourth passage 258, respectively, so that, when third screw 214 and fourth screw 218 are driven into support 22, wire 26 may be captured and held in place.

Second staple 206 has a third portion 230 and a fourth portion 234. Third portion 230 includes third passage 254; fourth portion 234 includes fourth passage 258. Third portion 230 and fourth portion 234 connect together via a second bridge 238. Second bridge 238 is arched on top and below unlike first bridge 202, which is flat on top and arched below.

Second staple 206 may be made of metal, plastic or a composite material. If made of metal, second staple 206 may include an insulator 242, as shown in FIG. 8, which may have a configuration similar to and conforming with second coupler 210, that is, insulator 242 may have a fifth portion 246 and a spaced apart sixth portion 250, with a third passage 254 and a fourth passage 258 dimensioned to accommodate third screw 214 and fourth screw 218, respectively. Insulator 242 may be made of plastic, composite material or other non-conducting material.

Third passage 254 and fourth passage 258 are spaced apart and parallel so third screw 214 and fourth screw 218 may be driven simultaneously by first screw-driving tool 152 and second screw-driving tool 160 of drill bit 18.

Figure 9:
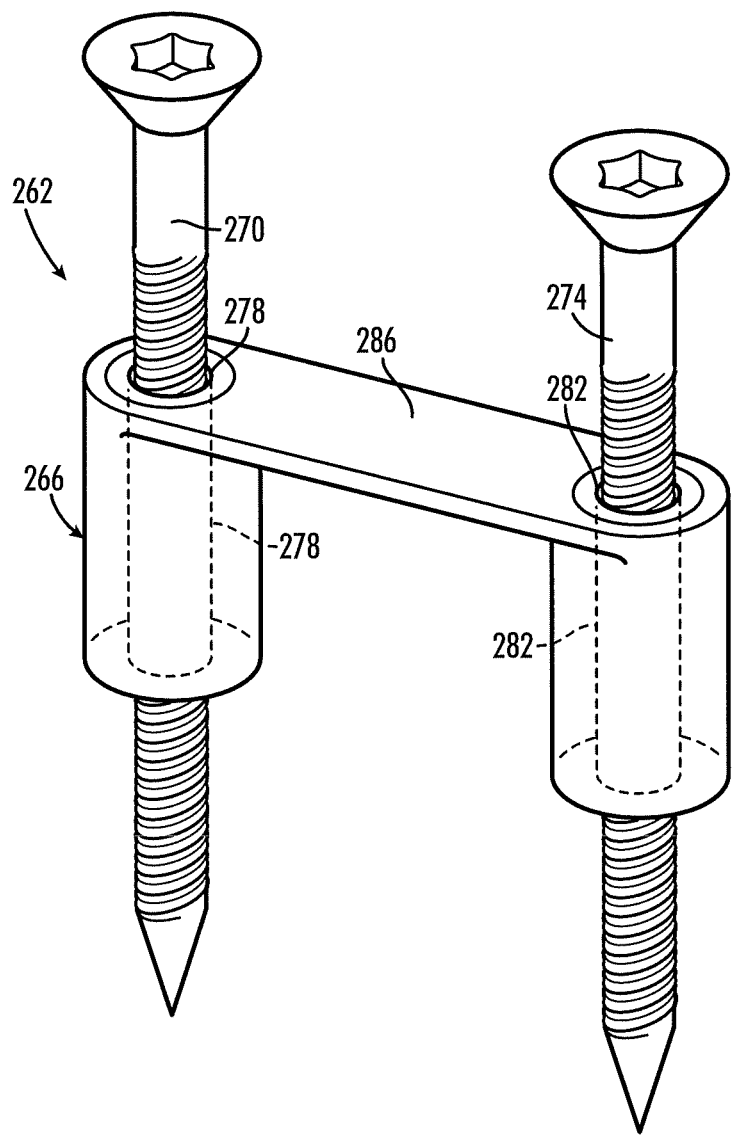
FIG. 9 is a top, right, perspective view of another alternative staple for use with the drill bit of FIG. 1, according to another aspect of the disclosure.
Figure 10A:
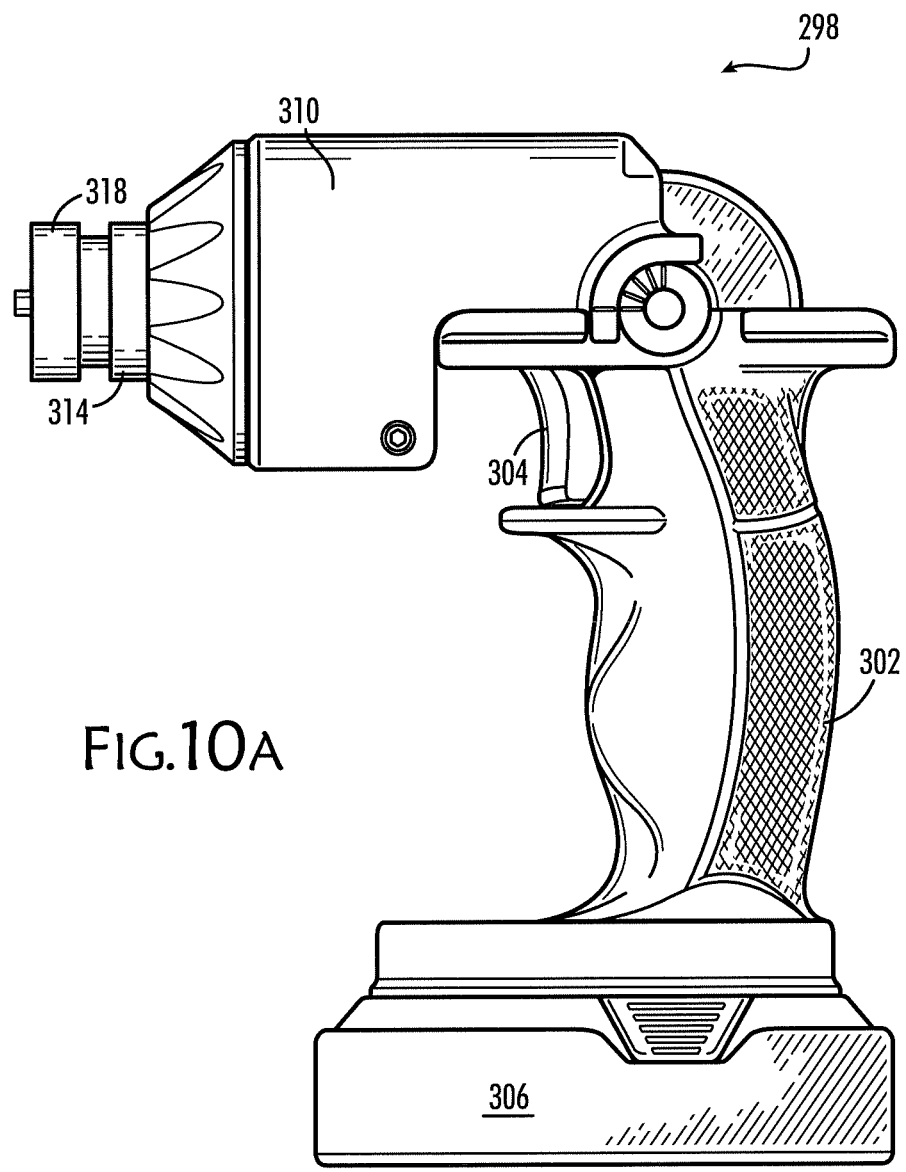
FIG. 10A is a side view of a drill for use with the present bit and stapler oriented in the horizon position for driving staples, according to an aspect of the disclosure.
Figure 10B:
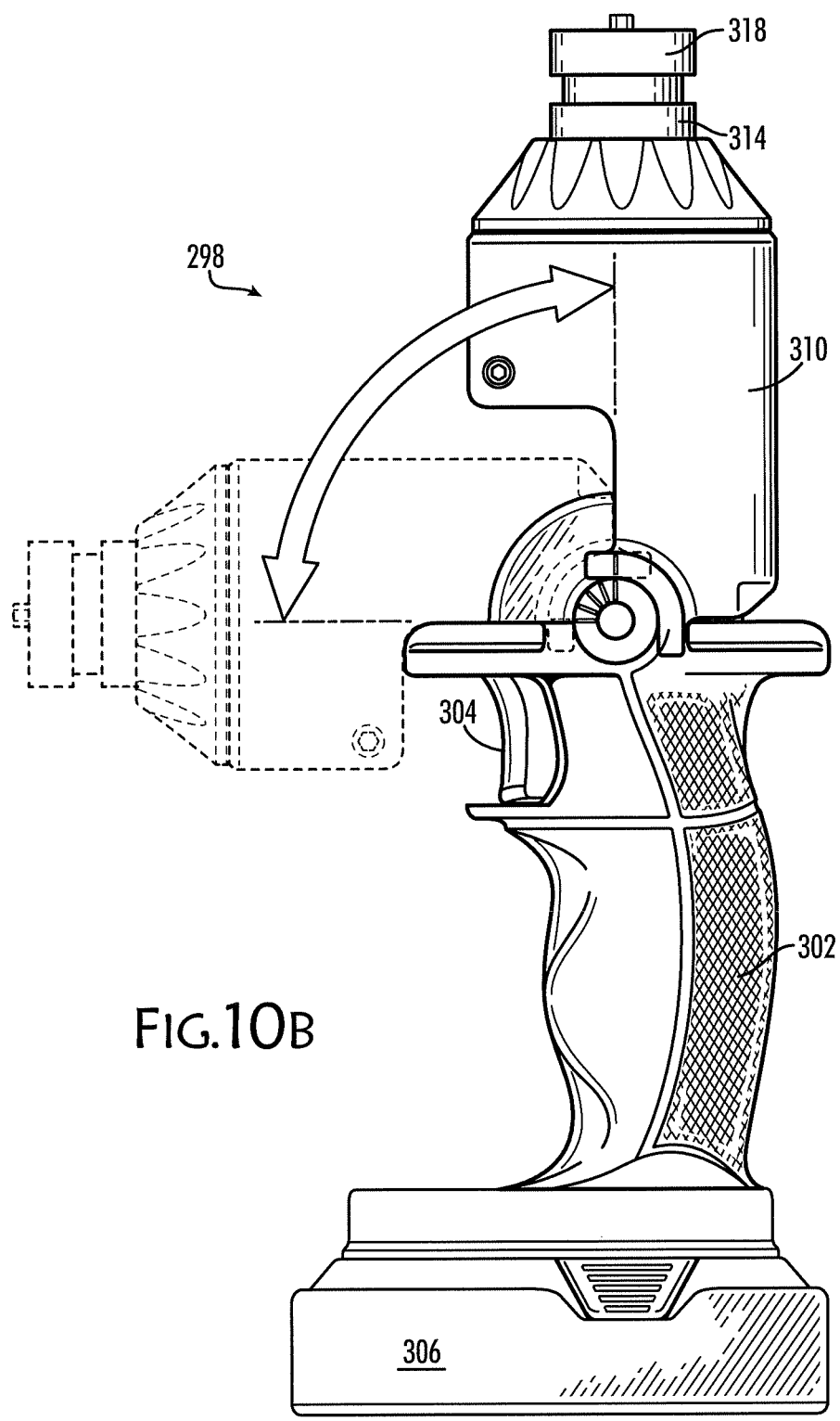
FIG. 10B is a side view of the drill of FIG. 10A rotated to the vertical position for use with the present bit and stapler for driving staples, according to an aspect of the disclosure.
Figure 11A:
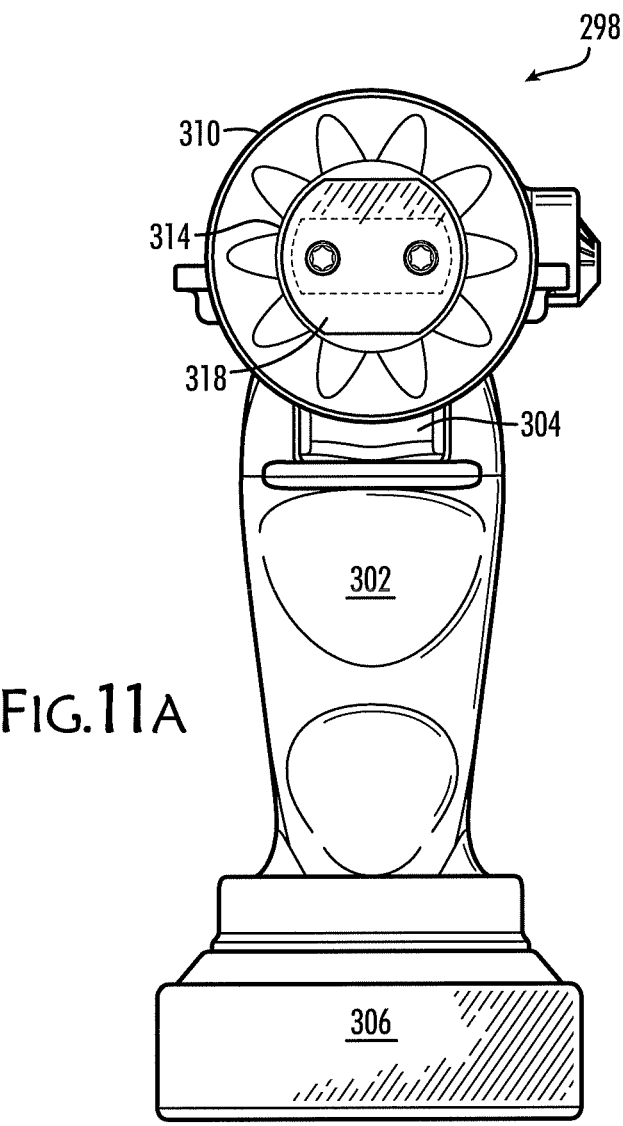
FIG. 11A is a front view of the drill shown in FIG. 10A, showing the drill bit in phantom lines and in a horizontal position, according to an aspect of the disclosure.
Figure 11B:
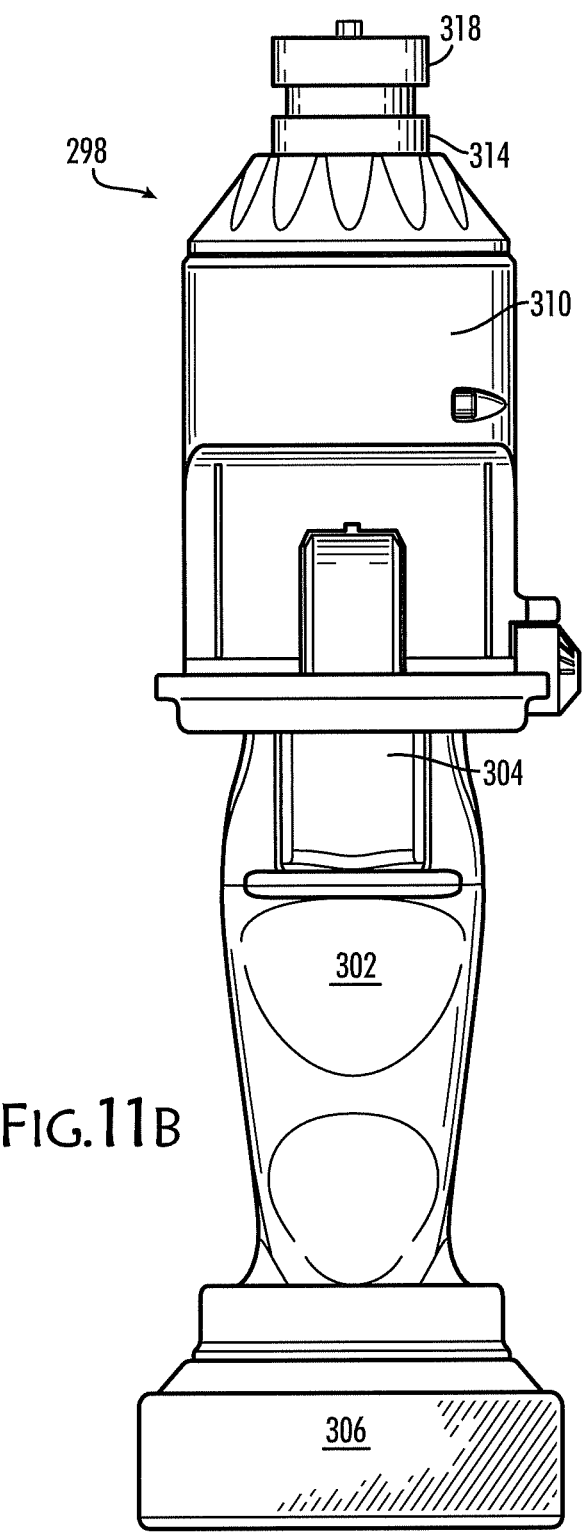
FIG. 11B is a front view of the drill shown in FIG. 11A, showing the drill bit rotated 90 degrees, according to an aspect of the disclosure.

In FIG. 9, there is shown a third staple 262, which includes a third coupler 266 holding a fifth screw 270 and a sixth screw 274 in a seventh passage 278 and an eighth passage 282, respectively. Third coupler 266 has a flat bridge 286 that connects a seventh portion 290 and an eighth portion 294.

FIGS. 10A, 10B, 11A and 11B show a drill 298 with a handle 302, which includes a trigger 304, and a rechargeable battery compartment 306. Drill 298 has a pivotable head 310, which can be seen by comparing FIGS. 10A and 10B so that drill 298 can be easily used to drive staples at any angle between zero and 90 degrees.

Drill 298 has a telescoping chuck 314 that extends forward several centimeters when the user is driving staples in tight areas that are difficult to reach. Moreover, drill 298 holds a drill bit 318 so that it is also able to rotate 90 degrees, which can be seen by comparing FIGS. 11A and 11B.

Those skilled in the art of construction and installation of utilities in buildings under construction will appreciate that many modifications and substitutions may be made to the forgoing description of aspects without departing from the spirit and scope of the disclosure.

What is claimed is:

1. An apparatus, said apparatus comprising:
   (a) a drill; and
   (b) a drill bit carried by said drill, including
      (i) a housing having a side wall defining an interior with an open end and a closed end, said closed end opposing said open end, and wherein said closed end has a hole formed therein;
      (ii) a central shaft extending from said interior of said housing through said hole in said closed end of said housing;
      (iii) a central gear attached to said central shaft inside said housing, wherein said central shaft is operable to rotate said central gear;
      (iv) a first planetary gear meshed with said central gear;
      (v) a second planetary gear meshed with said central gear, wherein said central gear is operable to rotate said first planetary gear and said second planetary gear;
      (vi) a first screw-driving tool carried by said first planetary gear and coaxial with said first planetary gear;
      (vii) a second screw-driving tool carried by said second planetary gear and coaxial with said second planetary gear; and
   (c) a staple including
      (i) a first screw, said first screw-driving tool of said drill bit operable to drive said first screw;
      (ii) a second screw, said second screw-driving tool of said drill bit operable to drive said second screw, and
      (iii) a coupler, wherein said coupler has a first passage and a second passage formed therein, said first passage and said second passage being parallel, said first passage dimensioned to receive said first screw, said second passage dimensioned to receive said second screw, wherein said coupler is operable to hold said first screw and said second screw in parallel, and wherein said first screw, when received in said first passage, extends beyond said first passage, and wherein said second screw, when received in said second passage, extends beyond said second passage; and
   (d) a harness removably attached to said drill and to said open end of said drill bit housing, said harness operable to prevent said drill bit housing from rotating.

2. The apparatus of claim 1, wherein said first planetary gear has a first shaft and said second planetary gear has a second shaft, said first shaft being coaxial with said first screw-driving tool and said second shaft being coaxial with said second screw-driving tool.

3. The apparatus of claim 2, wherein said first shaft and said second shaft are parallel.

4. The apparatus of claim 1, wherein said closed end of said housing has a first bushing and a second bushing, and wherein said first planetary gear has a first shaft with a first end in said first bushing, and said second planetary gear has a second shaft with a second end in said second bushing, said first end of said first shaft carrying said first screw-driving tool and said second end of said second shaft carrying said second screw-driving tool.

5. The apparatus of claim 4, further comprising a plate inside said housing, said plate being between said open end of said housing and said central gear and wherein said plate has a first hole for said first screw-driving tool to extend therethrough and a second hole for said second screw-driving tool to extend therethrough.

6. The apparatus of claim 1, wherein said coupler includes a first portion containing said first passage and a second portion containing said second passage.

7. The apparatus of claim 6, wherein said coupler includes a bridge and wherein said first portion of said coupler is connected to said second portion by said bridge.

8. The apparatus of claim 7, wherein said bridge is arched.

9. The apparatus of claim 1, wherein said coupler is made of metal.

10. The apparatus of claim 1, further comprising an insulator carried by said staple.

11. An apparatus, comprising:
   (a) a drill bit housing having a side wall defining an interior with an open end and a closed end, and wherein a hole is formed in said closed end;
   (b) a harness having a first end attachable to said open end of said drill bit housing;
   (c) a central shaft extending from said interior of said drill bit housing through said hole in said closed end, said central shaft adapted to be rotated by a power tool, said harness having a second end attachable to said power tool to prevent said drill bit housing from rotating with respect to said power tool;

(d) a central gear inside said drill bit housing and attached to said central shaft, wherein said central shaft is operable to rotate said central gear;

(e) a first planetary gear meshed with said central gear;

(f) a second planetary gear meshed with said central gear, wherein said central gear is operable to rotate said first planetary gear and said second planetary gear;

(g) a first screw-driving tool carried by said first planetary gear, wherein said first planetary gear is operable to rotate said first screw-driving tool; and (h) a second screw-driving tool carried by said second planetary gear, wherein said second planetary gear is operable to rotate said second screw-driving tool and wherein said first screw-driving tool and said second screw-driving tool are operable to drive a pair of screws.

12. The apparatus of claim 11, wherein said first screw-driving tool and said second screw-driving tool are parallel.

13. The apparatus of claim 11, wherein said first planetary gear has a first shaft and said second planetary gear has a second shaft, said first shaft being coaxial with said first screw-driving tool and said second shaft being coaxial with said second screw-driving tool.

14. The apparatus of claim 11, wherein said closed end of said housing has a first bushing and a second bushing, and wherein said first planetary gear has a first shaft with a first end in said first bushing and a second end carrying said first screw-driving tool, and said second planetary gear has a second shaft with a first end in said second bushing and a second end carrying said second screw-driving tool.

15. The apparatus of claim 11, further comprising a plate inside said housing, said plate being between said open end of said housing and said central gear and wherein said plate has a first hole for said first screw-driving tool to extend therethrough and a second hole for said second screw-driving tool to extend therethrough.

16. The apparatus of claim 11, wherein said central shaft has a first end and a second end, said first end of said central shaft extending through said hole in said closed end of said housing, said first end of said central shaft being operable to be gripped by said power tool.

\* \* \* \* \*